US007111316B1

(12) United States Patent
Zahorjan et al.

(10) Patent No.: US 7,111,316 B1
(45) Date of Patent: Sep. 19, 2006

(54) METHOD FOR EFFICIENT, ON-DEMAND DATA STREAMING

(75) Inventors: John Zahorjan, Seattle, WA (US); Derek L. Eager, Saskatoon (CA); Mary K. Vernon, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 880 days.

(21) Appl. No.: 09/633,507

(22) Filed: Aug. 7, 2000

Related U.S. Application Data

(60) Provisional application No. 60/147,569, filed on Aug. 6, 1999.

(51) Int. Cl.
*H04N 7/173* (2006.01)
(52) U.S. Cl. ...................................................... 725/97
(58) Field of Classification Search .................. 725/93, 725/95, 97, 91, 92, 87, 100; H04N 7/173
See application file for complete search history.

(56) References Cited

U.S. PATENT DOCUMENTS

| | | | | |
|---|---|---|---|---|
| 5,512,934 | A | * | 4/1996 | Kochanski .................... 725/97 |
| 5,631,694 | A | * | 5/1997 | Aggarwal et al. ............. 725/93 |
| 5,845,279 | A | * | 12/1998 | Garofalakis et al. ........... 707/7 |
| 6,543,053 | B1 | * | 4/2003 | Li et al. ......................... 725/88 |

OTHER PUBLICATIONS

*Skyscraper Broadcasting: A New Broadcasting Scheme for Metropolitan Video-on-Demand Systems*, Kien A. Hua et al., SIGCOMM '97 Cannes, France.

*A Low Bandwidth Broadcasting Protocol for Video on Demand*, Jehan-Francois Paris et al., Int'l Conference on Computer Communication and Networks (ICCCN), Oct. 1998.

*Efficient Broadcasting Protocols for Video on Demand*, Jehan-Francois Paris et al., Proc. Mascots '98, Montreal, Jul. 1998.

*Efficient Schemes for Broadcasting Popular Videos*, Lixin Gao, et al.

*Metropolitan area video-on-demand service using pyramid broadcasting*, S. Viswanathan et al., Multimedia Systems (1996) 4: 197-208.

*A Permutation-Based Pyramid Broadcasting Scheme for Video-on-Demand Systems*, Charu C. Aggarwal et al.

*Design and Analysis of Permutation-Based Pyramid Broadcasting*, Charu C. Aggarwal et al., U of S Computer Science, RC 20620, Nov. 8, 1996.

(Continued)

*Primary Examiner*—Vivek Srivastava
(74) *Attorney, Agent, or Firm*—Boyle Fredrickson Newholm Stein & Gratz S.C.

(57) ABSTRACT

Preferred techniques for transmitting on-demand data files include transmitting a first data stream in response to a first client request, and a new data stream in response to a subsequent second client request. The second client may snoop increasing amounts data from the first data stream, thereby decreasing the second client's reliance on the second data stream until the client has merged with the first data stream, at which time transmission of the second data stream will be discontinued. Alternatively, a patch data stream may be broadcast to the second client having a bandwidth less than that of the first data stream. The second client, in addition to receiving the second data stream real-time, will record data from a patch data stream until the second client has merged with the first data stream, at which time transmission of the second data stream and patch data stream will be discontinued.

9 Claims, 8 Drawing Sheets

OTHER PUBLICATIONS

*Tailored transmissions for efficient Near-Video-On-Demand service\**, Yitzhak Birk et al.

*Reducing I/O Demand in Video-On-Demand Storage Servers*, Leana Golubchik et al., SIGMETRICS '95 Ottawa, Ontario, Canada.

*On Optimal Piggyback Merging Policies for Video-On-Demand Systems*, Charu Aggarwal et al., SIGMETRICS '96, May 1996 PA.

*Adaptive Piggybacking Schemes for Video-on-Demand Systems*, Charu C. Aggarwal et al., RC 20635 (Nov. 19, 1996) IBM Research Division.

Merging video streams in a multimedia storage server: complexity and heuristics, Siu-Wah Lau et al., Multimedia Systems (1998) 6:29-42.

*Patching: A Multicast Technique for True Video-on-Demand Services*, Kien A. Hua et al., ACM Multimedia 98—Electronic Proceedings.

*Improving Video-on-Demand Server Efficiency Through Stream Tapping*, Steven W. Carter, et al., Proc. Int'l Conf. On Computer Communication and Networks (ICCCN), Las Vegas, Sep. 1997, pp. 200-207.

*Stream Tapping: a System for Improving Efficiency on a Video-on-Demand Server*, Steven w. Carter et al., UCSC-CRL-97-11, Nov. 2, 1997.

*Supplying Instantaneous Video-on-Demand Services Using Controlled Multicast*, Lixin Gao et al.

*Optimal Patching Schemes for Efficient Multimedia Streaming\**, Subhabrata Sen et al.

*Dynamic batching policies for an on-demand video server*, Asit Dan et al., Multimedia Systems (1996) 4:112-121.

*On Optimal Batching Policies for Video-on-Demand Storage Servers*, Charu C. Aggarwal et al., IEEE Multimedia Computing & Systems Conf., Hiroshima, Japan, Jun. 1996.

*Group-Guaranteed Channel Capacity in Multimedia Storage Servers*, Athanassios K. Tsiolis et al., SIGMETRICS 1997 Conference.

\* cited by examiner

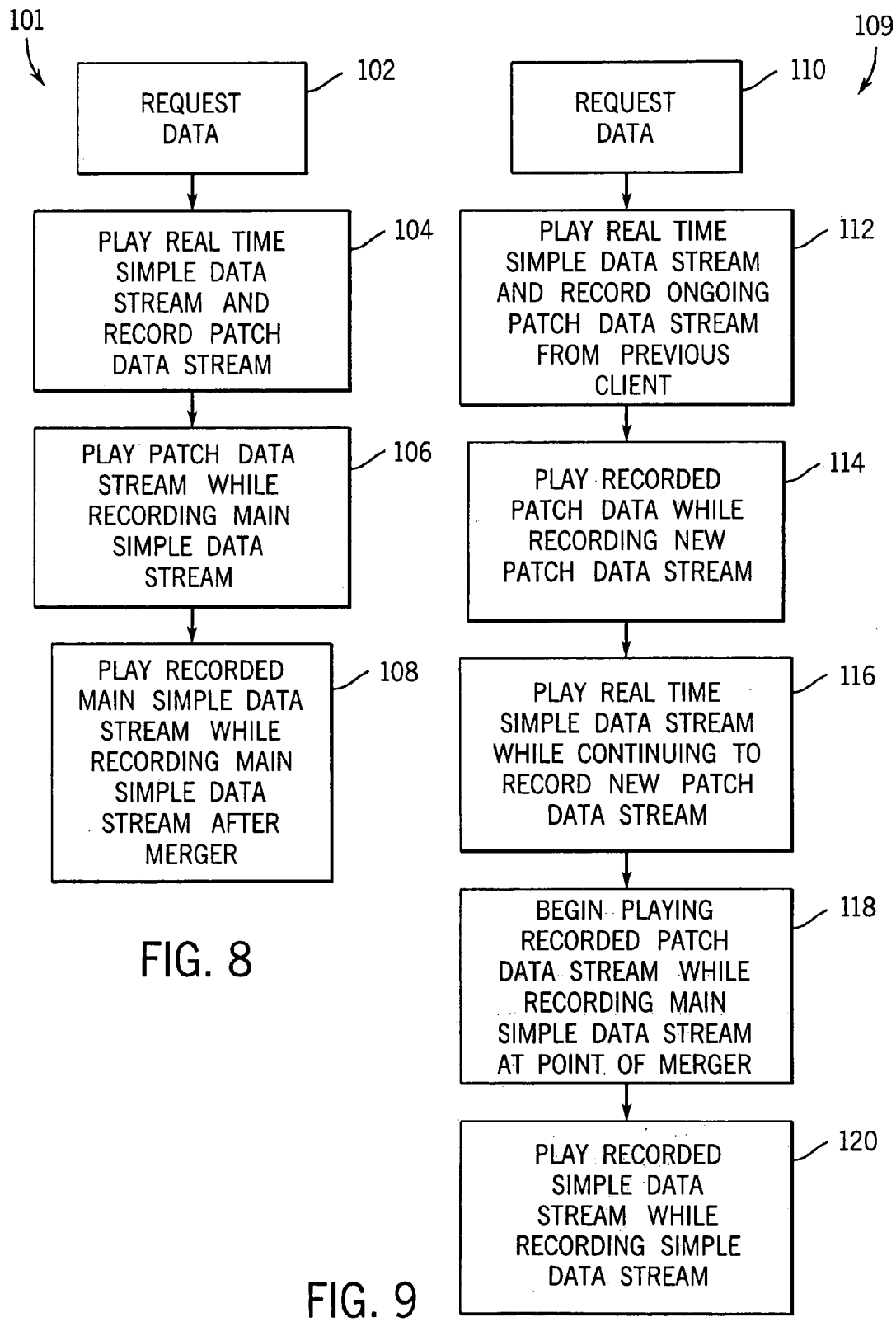

METHOD FOR EFFICIENT, ON-DEMAND DATA STREAMING

A CROSS-REFERENCE TO RELATED APPLICATIONS

This application is based on provisional application 60/147,569 filed Aug. 6, 1999 and claims the benefit thereof.

STATEMENT REGARDING FEDERALLY SPONSORED RESEARCH OR DEVELOPMENT

This invention was made with the United States government support awarded by the following agencies:
NSF 9975044
The United States has certain rights in this invention.

BACKGROUND OF THE INVENTION

The present invention relates to methods of transmitting program data files, or "streaming data", such as video or audio files, to multiple users at arbitrary delivery times within a delivery period and as selected by the users. In particular, the present invention provides a method of reducing the bandwidth or other costs associated with transmitting such data at different delivery times to multiple users.

Program data files, or "streaming data," is data that a user will process sequentially as it is received during a transmission. Examples of streaming data are video and audio programs, including movies, television shows, news clips, product advertisements, medical or recreational information, or education programs. This list of examples is not exhaustive. As implied by the examples, though, there is an application "playback rate" that imposes timeliness constraints on the delivery of data so that the application can make continuous progress through the data once it has reached a critical point (e.g., the display of a frame) on some initial segment of it. It should be recognized that the term "video program" as used below is meant to be inclusive of a variety of circumstances, including, for example, an independent entity such as a movie or television show, a piece of a more complex multimedia presentation, or a single layer of a program that has been encoded using base and enhancement layers.

"On-demand delivery" of streaming data is the delivery of streaming data beginning at a delivery time occurring substantially at the time of a user request for the data. For example in a video on-demand (VOD) system, a customer might be able to view a video program beginning at any time.

In order to reduce the costs of storage and distribution, "programs" of streaming data may be stored at and transmitted from a central server (which may consist of one or more machines) to a large number of users or clients via phone lines, cable, broadcast radio, satellite links or other media. For a popular program, many new requests will arrive at the central server during a delivery period.

On-demand delivery may be provided by making a separate transmission of data to each client when the client request arrives. This approach is simple and works with standard receiving device but has the disadvantage of requiring a large number of transmission channels, one for each new client. The transmission capacity of the server and the intervening communications medium (phone lines, cable, etc.) is termed "bandwidth" referring generally to the amount of data that can be transmitted in a given time interval. For this simple scheme of providing on-demand delivery of streaming data, the server bandwidth required to serve the clients increases linearly with the number of clients and thus does not scale well to large numbers of clients.

Piggybacking

Referring to FIG. 2, the transmission of each data stream describes a line on a graph plotting sequential position in the data stream (for example a frame number in a video transmission) against time. Sequential position as shown varies between zero and one where one indicates completion of the data stream.

A simple data stream 10 requested at delivery time $t_0$ may be delivered at a rate (indicated by the slope of the line extending from time $t_0$) equal to the rate at which the simple data stream 10 is received and reviewed by the client. In this way the client may directly display the received data in real-time without storage of the data.

At a later time $t_1$ the server may receive a second request for the same program. Instead of transmitting an entirely new data stream, the technique of piggybacking responds to this second request by transmitting an accelerated data stream 12 at a rate higher than the simple data stream 10. This may be done by adjusting the display rate in the case of video files so that the video plays imperceptibly faster. As a result of these differences in transmission rate, the data streams 10 and 12 will intercept at time $t_2$ and the accelerated data stream 12 may terminate, saving the bandwidth that would have been required for its continuation.

Like the previous method of on-demand delivery, piggybacking requires no storage of data at the client's receiver yet it reduces the bandwidth required for multiple clients. Nevertheless, the distortions of the later transmission, which must be accelerated, may be unacceptable.

Skyscrapering

Referring to FIG. 3, a second way of limiting the bandwidth required for supporting on-demand transmission of streaming data divides the program into a plurality of "channels" 20a through 20d with each successive channel repeatedly transmitting a different time segment 21a–21d of the program. Thus, for example, channel 20a represented by a row of the chart of FIG. 2 may repeatedly transmit the first one-minute of the program, thus, from zero to one minute. Channel 20b in contrast may repeatedly transmit from minutes 1 to 3 of the program while channel 20c may transmit minutes 3–5 of the program, each of channels 20b and 20c repeating their segment on a two-minute basis. Channel 20d may transmit minutes 5–9.

Under this system, a client wishing to receive the program at time $t_0$ waits until the next delivery time on an even minute increment (i.e., $t_1$) and connects to channel 20a to receive the first minute of the program indicated by stream 22. The client's receiver begins displaying that first minute and simultaneously records channel 20b providing segment 21b of minutes 1–3 of the program. The receiver thus receives a composite data stream 23 which soon merges with earlier stream 24 started at $t_0$. At the conclusion of the stream 22 at time $t_2$, the client's receiver begins playing the previously recorded portions of stream 24 of segment 21b at its beginning while continuing to record segment 21b on channel 20b. At time $t_4$, one minute later, the client's receiver begins recording channel 20d in preparation for the termination of the segment on channel 20c two minutes later. In this way, by simultaneously recording and playing different channels, a continuous program may be assembled starting at any even minute interval. This method is termed "skyscrapering" referring generally to the way the complete program is assembled from segments of different sizes which when stacked like blocks from smallest to largest resemble the profile of a sky scraper. Further the reconstructed programs are not time distorted as required by piggybacking.

It can be seen from this simple example that with skyscrapering, four channels may provide a nine-minute program starting every minute. If separate data streams were used for each new start time, nine channels would be required so it is apparent that skyscrapering much reduces the bandwidth required for regular transmissions. It should be appreciated that longer running programs, such as a two-hour movie, for example, would require a significantly increased number of channels.

On the other hand, the client receiver must have the ability to concurrently store and playback received data and must be capable of following a more sophisticated storage and playback scheme than is required for piggybacking. Further because periodicity of the initial time segments (for channel 20a) is fixed and predetermined, skyscrapering is not truly an on-demand system as the client must wait for the initial segment starting time. Additionally, the skyscrapering technique mandates that a predetermined number of channels be available, which may be more than necessary given a particular demand pool, thereby wasting bandwidth and placing unnecessary burdens on the server.

Patching

Patching, like the skyscraper technique, assumes that the client receiver may simultaneously store and playback portions of the program and may follow a given storage and playback scheme. Because the technique of patching as some similarities to the technique of piggybacking, it will be explained by referring again to FIG. 2.

Again assume a simple data stream 10 is requested by a first client at delivery time $t_1$ and delivered at a rate equal to the rate at which the client reviews the simple data stream 10. A request for the same program by a second client at time $t_2$ causes the allocation of a second simple data stream 14 having the same data rate as simple data stream 10 by starting over at time $t_2$ at the beginning of the program.

At time $t_2$ the second client receiver also begins recording the ongoing transmission of the simple data stream 10 from stream position $p_1$. The receiver is thus receiving data at a higher rate of a composite data stream 15 equal to the sum of the rates of simple data streams 10 and 14. Accordingly, the second client requires the capability to receive twice the amount of data as the first client in order to process both simple data streams 10 and 14. This composite stream merges with the simple data stream 10 at time $t_3$ at which time simple data stream (being part of composite data stream 15) may be terminated saving the bandwidth that would have been required if simple data stream 14 had continued for the length of the program without the attendant time distortion.

At a fourth time t4, a third client may request the media stream and composite data stream 13 may be created from the ongoing simple data stream 10 and a new simple data stream 16. This composite data stream 13 then merges with simple data stream 10 and simple data stream 16 is terminated. Additional client requests may be accommodated in this manner until the time when a composite data stream will no longer be able to merge with the simple data stream 10 before its conclusion, at which time a new simple data stream 10 is started.

Whereas unlike skyscrapering, both piggybacking and patching provide true on-demand delivery of a program, their bandwidth requirements will generally increase faster, with increasing numbers of client requests, than will the bandwidth requirements for skyscrapering. Both patching and skyscrapering deliver program data without distortion, however they require a transmission bandwidth of twice the playback rate. Many foreseeable delivery channels (e.g. the internet) cannot deliver this excess capacity. Further, even with future bandwidth increases, twice the capacity of the playback rate may severely limit the number of subscribers that may be served. What is therefore needed is an on-demand data streaming technique that reduces excess bandwidth while providing true on-demand delivery of a program without distortion of the delivered program.

BRIEF SUMMARY OF THE INVENTION

The present inventors have recognized that significant efficiencies in transmission can be gained in the on-demand transmission of a streaming data file to clients that receive bandwidth of less than twice the playback rate. The invention is also applicable more generally, when client received bandwidth is any non-integer multiple of the playback rate greater than one.

In accordance with a first aspect of the invention, one method of transmitting a streaming data file on-demand includes beginning a first transmission of the streaming data file at a time of a data request from a first client. Next, in response to a second client request for the data file, a second transmission of the streaming data file occurs as well as a patch data transmission. The patch data transmission occurs at a rate of transfer other than the playback rate, such that the second client has sufficient receive bandwidth to listen to both the second transmission and the patch transmission. Finally, once the amount of the streaming data file received by the second client equals the amount of the streaming data file received by the first client from the first transmission, and thus the second client is capable of receiving the remainder of the data file solely from the first transmission, the second transmission of the streaming data file and the patch data transmission are discontinued.

In accordance with another aspect of the invention, a patch data stream is not used. Instead, the first transmission is structured so as to permit the second client to listen to a fraction of this transmission, concurrently with listening to the second transmission of the streaming data file and in accordance with the client's receive bandwidth limitations.

In accordance with another aspect of the invention, the patch data stream and the second transmission of the data file are combined into a single higher-rate transmission.

It is thus an object of the invention to effect merges of transmission streams by enabling clients to acquire data at higher than the playback rate, without such clients having to listen to multiple streams each being transmitted at the full playback rate.

The foregoing may not apply to all embodiments of the inventions and is not intended to define the scope of the invention, for which purpose claims are provided. In the following description, reference is made to the accompanying drawings, which form a part hereof, and in which there is shown by way of illustration, and not by way of limitation, a preferred embodiment of the invention. Such embodiment also does not define the scope of the invention and reference must be made therefore to the claims for this purpose.

BRIEF DESCRIPTION OF THE DRAWINGS

FIG. 8 is a flowchart illustrating the steps performed by a second client to receive data on-demand as illustrated in FIG. 4C;

FIG. 9 is a flowchart illustrating the steps performed by a third client to receive data on-demand as illustrated in FIG. 4C;

DETAILED DESCRIPTION OF THE INVENTION

The example of video on-demand will be described, it being understood that the invention applies also to other types of streaming data.

Figure 1:
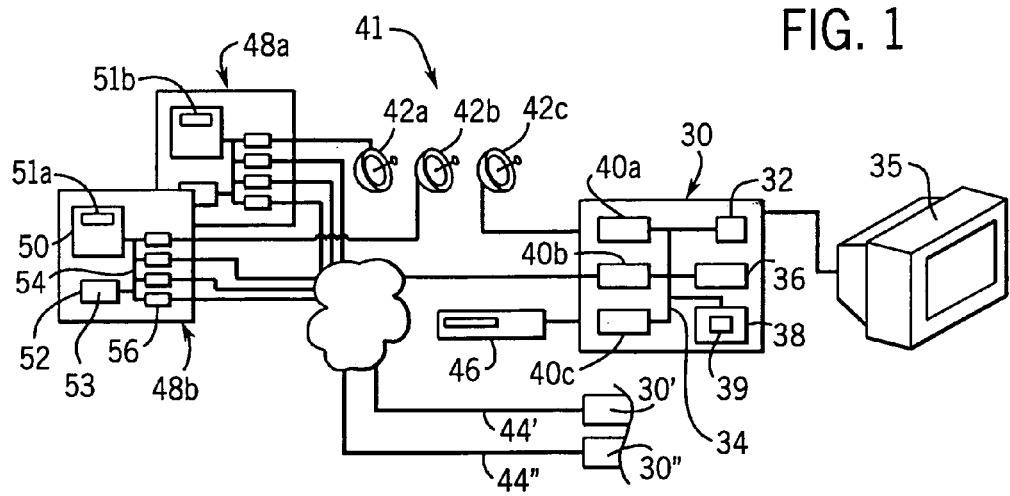
FIG. 1 is a block diagram of a transmission and receiving system suitable for practice of the present invention showing connection of a server through a variety of links to multiple clients.
Figure 2:
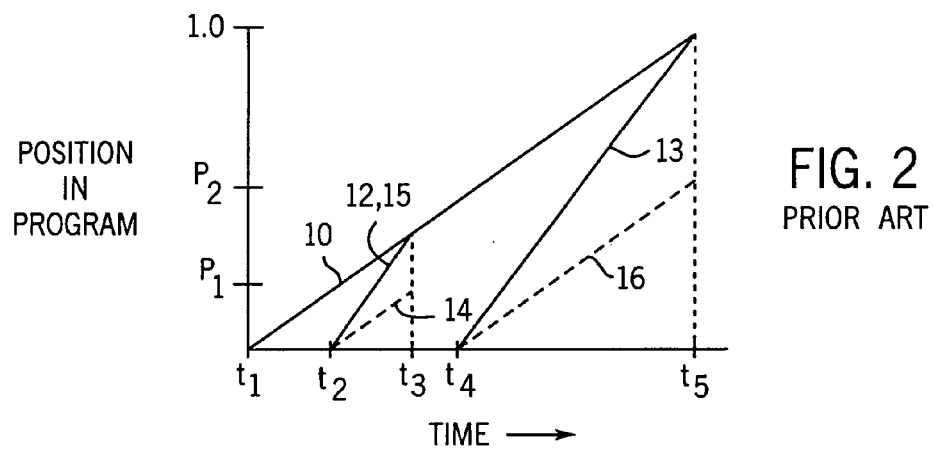
FIG. 2 is a graph plotting program position vs. time for transmissions under the prior art patching and piggybacking techniques as described above.
Figure 3:
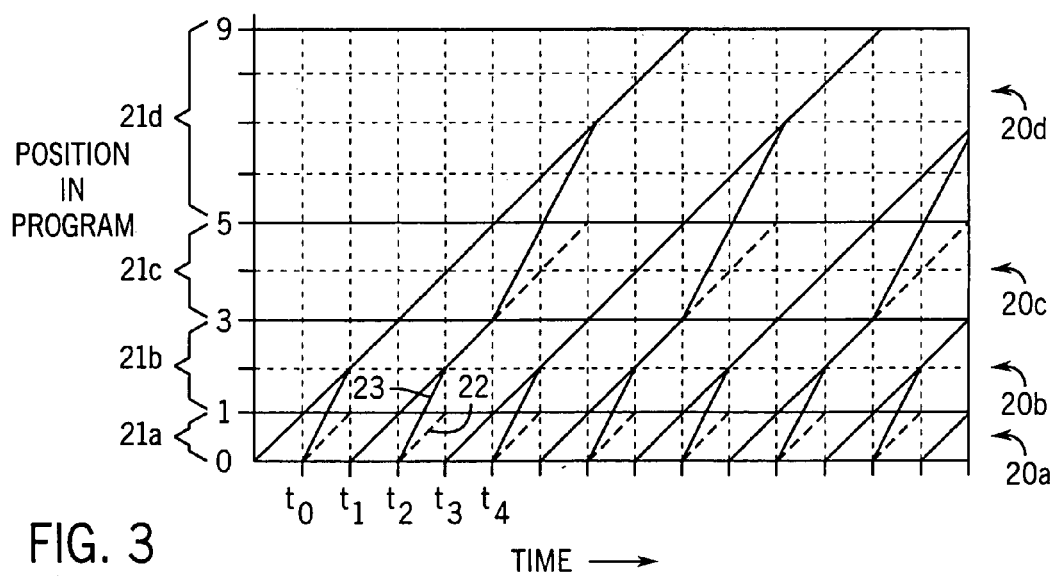
FIG. 3 is a graph similar to that of FIG. 2 showing the prior art technique of skyscrapering described above such as illlustrates its multi-level hierarchical nature as recognized by the present inventors.

Referring initially to FIG. 1, a client receiver 30 connects via an output port 32 with a television monitor 35 on which a client may view streamed video data. Output port 32 receives data via an internal bus 34 from a processor 36 that may execute a stored receiver program 39 (as will be described below) contained in memory 38 also connected to the internal bus 34. The internal bus also connects to one or more input/output ("I/O") ports 40a through 40c, which provide for the receipt of streaming data. I/O ports 40a through 40c may be connected, for example, singly or multiply to any of a variety of transmission media 41 including a satellite antenna 42, ground lines 44 such as a telephone line or cable, or to a fixed media player 46, any of which may provide for one or more data streams.

A server 48 holds a video program 51 in memory 50, which will be formatted into data streams according to the present invention by a processor 52 executing a stored server program 53 (described below) also stored in memory. The processor 52 and memory 50 communicate with each other over an internal bus 54 and also with multiple I/O ports 56, which may communicate via the previously described transmission media 58 and devices to multiple receivers 30, 30' and 30".

The particular low-level communication protocols between the server 48 and the receivers 30 are not critical provided they allow for broadcasting or multicasting in multiple logical channels and in a broadcast or multicast manner to other receivers 30', 30" and 30'" shown connected via lines 44', 44" or 44'". Additionally, while FIG. 1 shows the end points of the transmission as the server and the client viewer, the transmission techniques could be used in other places. For example, the "client end" could be a regional proxy, or simply a machine that processes but does not display the material. Similarly, the server end could be a regional proxy that doesn't store the entire video at any point in time (if, for example, it itself is receiving it from somewhere).

1. Patching Techniques

Figure 4A:
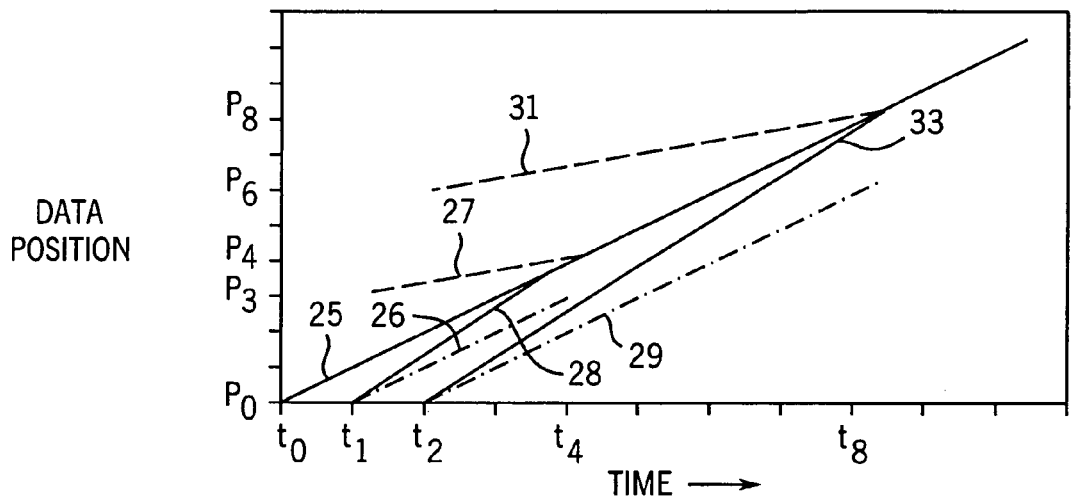
FIG. 4A is a graph plotting program position vs. time for transmissions under the patching technique in accordance with one embodiment of the invention.
Figure 4B:
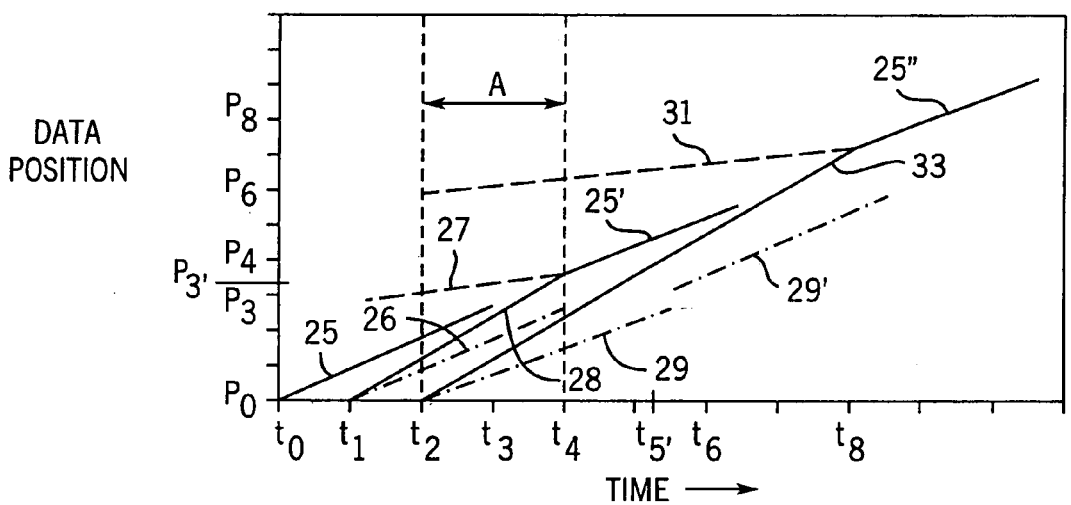
FIG. 4B is a graph plotting program position vs. time for transmissions under a shared patching technique in accordance with an alternate embodiment of the invention.
Figure 4C:
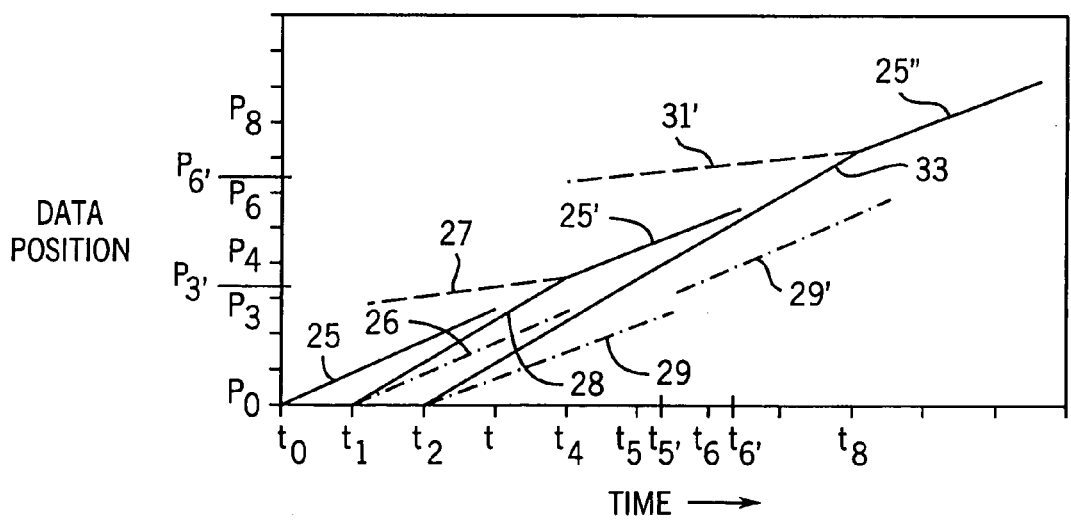
FIG. 4C is a graph plotting program position vs. time for transmissions under a discontinuous patching technique in accordance with yet another embodiment of the invention.

Referring now to FIGS. 4A–C, three merging operations in accordance with preferred embodiments are depicted in which data sent from the server to a client includes data positions $p_0$–$p_8$ at times $t_0$–$t_8$. It should be appreciated that the entire data transfer is not necessarily shown in these figures and, rather, the figures illustrate the transfer of sufficient data over a corresponding period of time so as to complete a merging operation in accordance with the illustrated embodiments.

A. Simple Patching

Referring now in particular to FIG. 4A, a patching technique is illustrated in accordance with one embodiment of the invention that allows the system to take advantage of a portion of the client's receive bandwidth that is only a fraction of the playback rate. For instance, in prior art patching techniques, as described above, a client would require twice the receive bandwidth necessary to play a real-time data stream. In the preferred embodiment of the present invention, the client need be capable of receiving significantly less bandwidth, as will be appreciated by the description below.

Assume that a streaming data file is requested by a first client at time $t_0$, and delivered by simple data stream 25 at a rate sufficient to satisfy the file "playback rate"; i.e., the rate at which the client reviews the requested file. The simple data stream is multicast or broadcast in real time by a server, such that at least one block of data is transmitted within a corresponding time block at least the normal playback rate. In FIG. 4 we assume that this transmission takes place at the playback rate resulting in a slope of 1 as illustrated in the figures. A request for the same file by a second client at time $t_1$ causes the allocation of a second simple data stream 26 from the server having the same data rate as simple data stream 25 but starting over at time $t_1$ at the beginning of the file ($p_0$).

Also at time $t_1$ the second client receiver begins recording the ongoing transmission of a patch data stream 27 beginning at data position $p_3$. The receiver is thus receiving data of a composite data stream 28 at a rate equal to the sum of the rates of the simple data stream 26 and patch data stream 27. As three time blocks are consumed to receive one patch data block (i.e., between $p_3$ and $p_4$), the bandwidth of the patch data stream is illustrated as being 33% of the bandwidth of the simple data stream. Accordingly, a merging client requires 133% of the bandwidth needed to simply receive real time data, as opposed to the 200% required in accordance with previous patching techniques. It should be appreciated, however, that this additional bandwidth requirement may be varied by simply varying the bandwidth of the patch data stream. For instance, the slope of the patch data stream 27 could be changed to 0.1 to require a merging client to receive only 110% of the real-time bandwidth. Of course, decreasing the patch data slope correspondingly increases the amount of time necessary to complete a given merging operation.

As illustrated in FIG. 4A, the composite stream 28 merges with the simple data stream 25 at time $t_4$ at which time simple data stream 26 and patch stream 27 (being parts of composite data stream 28) may be terminated, saving the server and network bandwidth that would have been required if simple data stream 26 had continued for the length of the program.

At time $t_2$, a third client may request the streaming data file. FIG. 4A depicts a situation in which the composite data stream 33 is created from a new simple data stream 29 and a new patch data stream 31. Composite data stream 33 then merges with simple data stream 25 at time $t_8$, at which time simple data stream 29 and patch stream 31 are terminated.

A possible further efficiency can be realized in an alternate embodiment of the invention to avoid consuming extra bandwidth by transmitting the same data twice to, for example, both the first and second clients, when in reality the data only need be sent once to be mutually accessible to both clients. For example, it can be noted in FIG. 4A that the data between $p_3$ and $p_4$ is transmitted along main simple data stream 25 and patch data stream 27.

B. Shared Patching

This possible further efficiency may be realized by modifying the patching technique illustrated in FIG. 4 A to produce the patching technique illustrated in FIG. 4B. In particular, the server recognizes the second client at time $t_1$ and notes that the patch data stream transmits between $p_3$ and $p_4$. As a result, because the first client is also capable of receiving and recording the patch data stream 27 within this interval, there is no need to receive the data on the simple data stream 25. Accordingly, the data stream 25 is segmented into data stream 25–25' separated between times $t_3$ and $t_4$ (corresponding to data locations $p_3$ and $p_4$). As a result, when the second client begins receiving data streams 26 and 27, the first client will additionally record the patch data stream 27 until the two streams 28 and 25 merge. Additionally, when the third client begins receiving data at time $t_2$, the first client will additionally record the patch data stream 31 between $p_6$ and $p_8$ to form simple data stream segments 25'–25".

When the third client requests data at time t2, it also records the remaining data on patch data stream 27 beginning at data location $p_3'$ until $p_4$, when the patch data stream is terminated, thereby signifying the merger of composite data stream 28 with data stream 25. Accordingly, simple data stream 29–29' is broken at time $t_5'$ between data segment $p_3$–$p_4$. Accordingly, the server need only transmit the data in common to more than one client only once as opposed to the patching technique illustrated in FIG. 4A. Because multiple clients share the patch data streams 27 and 31, this is method is referred to as a shared patching technique, and reduces the total bandwidth during the merging operation. The method does, however, restrict the merging policy. Most importantly, with this technique a stream cannot simultaneously be trying to merge with an earlier stream, and be serving as the merge target for some later stream.

Another variant patching technique is illustrated with reference to FIGS. 4B and 4C. In particular, with the shared patching technique, when more than one client is merging at a particular point in time, as illustrated in FIG. 4B, between times $t_2$ and $t_3$, the first client is required to receive the simple data stream 25 as well as both patch data streams 27 and 31 as described above. Additionally, the second client is required to receive simple data stream 29 as well as patch data streams 27 and 31 between times $t_2$ and $t_4$. However, the combination of these three data streams may require more much bandwidth than a particular client may be able to receive at one given time. This could be exacerbated by additional client requests. One method of solving this problem would be to transmit data patches at lower rates so that a client with limited bandwidth capabilities would be able to process all necessary streams simultaneously. However, to do so would increase the amount of time needed to merge and would waste a client's bandwidth capabilities when the client is receiving fewer than the maximum number of possible data streams for that client's bandwidth capability.

C. Discontinuous Patching

The shared patching technique may be therefore made more efficient as is illustrated with specific reference to FIG. 4C. In particular, in accordance with the illustrated technique, when the third client requests data, it begins by receiving and playing the new simple data stream 29 while recording the remainder of the previous client's patch data stream 27 as described above. The third client's patch data stream 31' is not transmitted until the previous patch data stream 27 has been terminated. At that time ($t_4$), the third client may begin receiving patch data stream 31' corresponding to data location $p_6'$. As a result, transmission of the simple data stream segment 29' is not discontinued until time $t_8$, corresponding to data position $p_6'$.

It should be appreciated that, in the above-described patching embodiments, the speed of the merger operation may be adjusted by varying the slope of the patch data stream associated with a given client. Of course, greater slopes require greater bandwidth requirements for a given client in order to receive both the patch and simple data streams. In this respect, the preferred embodiment of the invention may be implemented in systems with any client receive bandwidth greater than the playback rate by adjusting the rate of patch data transfer accordingly. Although the patch data stream is transmitted at approximately 33% the rate of the simple data stream in FIGS. 4A–4C in accordance with the preferred embodiment, the patch data stream could require significantly less bandwidth, such as 20%, 15%, 10%, or even 5% extra bandwidth if so desired. As well, the techniques can be applied to take advantage of any fractional portion of client bandwidth capabilities when client bandwidth is high, for example, to take advantage of the "15% portion" when client receive bandwidth is 215% of the playback rate.

Figure 4D:
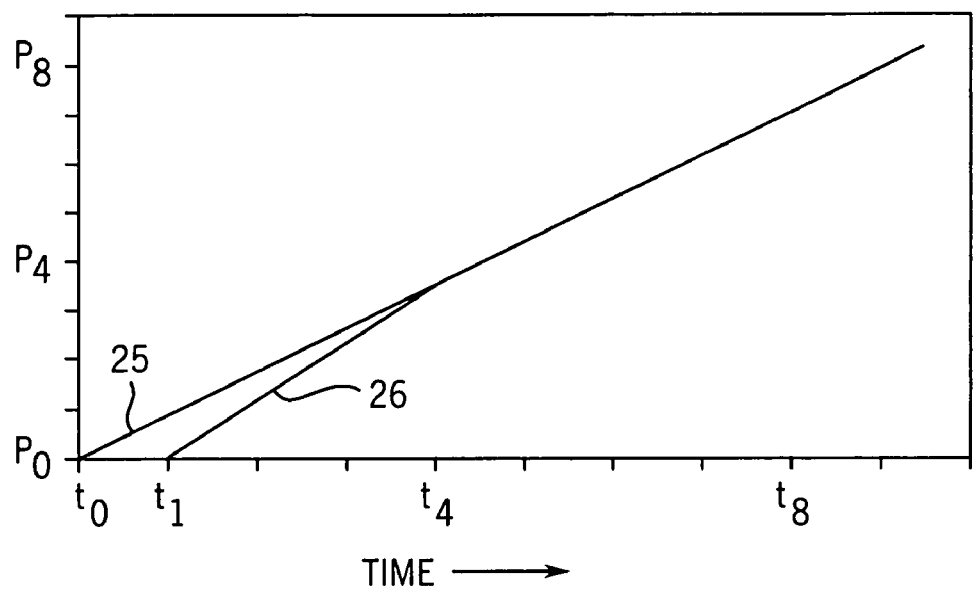

An alternative to the patching technique is presented with reference to FIG. 4D. In particular, as described above, a preexisting client receives real-time data from simple data stream 25. When a second client requests data at time $t_1$, the subsequent data stream 26 is transmitted at an increased rate with respect to simple data stream 25. The extra bandwidth associated with the transmission of data stream 26 parallels that associated with the extra bandwidth when transmitting a real time data stream and patch data stream. Accordingly, the client merges at $t_4$ as discussed above, but only one additional stream is transmitted in this embodiment as opposed to the patching techniques as described above, which require that two separate streams (simple data stream and patch data stream) be transmitted. In operation, the client plays the data from accelerated simple data stream 26 at a real time rate while buffering the extra data that is received ahead of when it is needed. Accordingly, once the simple data stream 26 catches up to the simple data stream 25, the merger occurs and the client receives all remaining data from simple data stream 25 while the client plays data from its buffer. Accordingly, at time $t_4$, simple data stream 26 is discontinued.

The above alternative illustrates that there are many ways to place the data that must be sent according to the various embodiments described above onto one or more physical transmission channels. As indicated by the alternatives described above, the invention does not intend to restrict the number of physical channels used to convey the data indicated as transmitted during each interval. In particular, more physical channels could be used in circumstances where that is advantageous.

2. Operation of Patching Techniques

Figure 5:
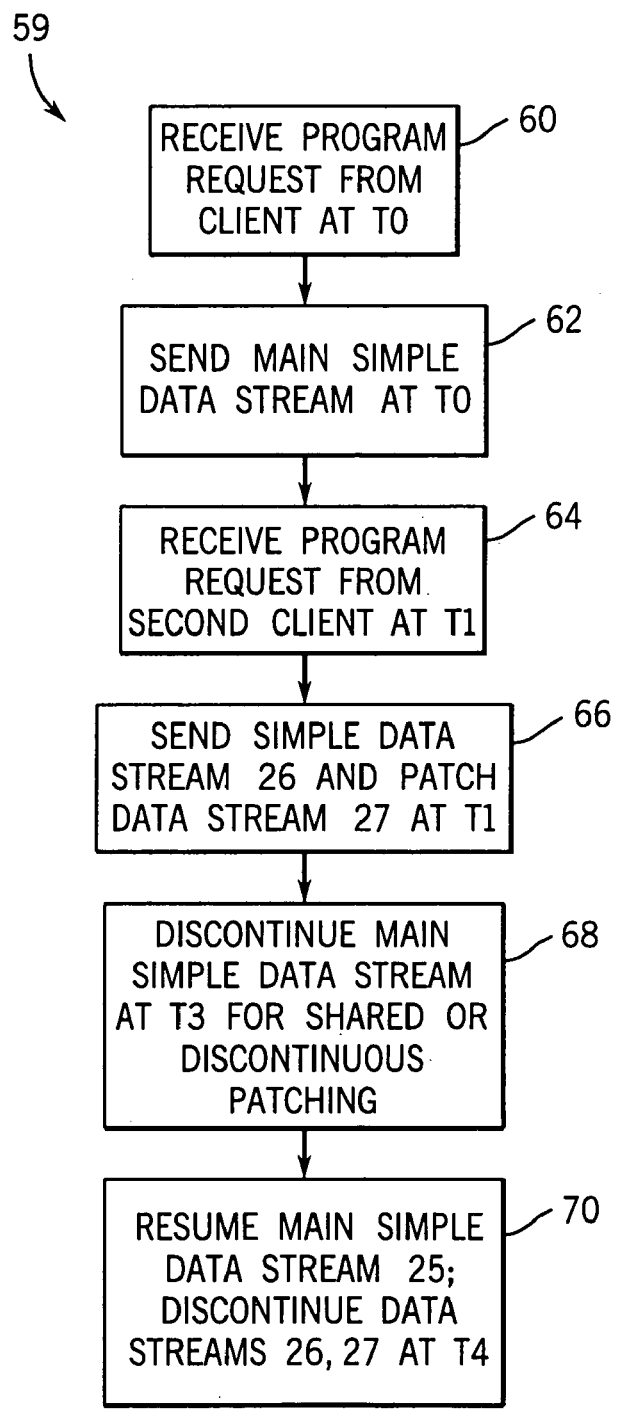
FIG. 5 is a flowchart illustrating the steps performed to transmit data to a first and a second client in accordance with any of the patching techniques illustrated in FIGS. 4A–4C.

Referring now to FIG. 5, a process 59 of transmitting data in accordance with the discontinuous patching method will now be described with continuing reference to FIG. 4C. The process 59 begins at step 60, where the server receives a data request from a first client and, at time $t_0$, begins sending the simple data stream 25 at step 62. During the transmission of data, the server receives another program request from a second client at step 64 and, at time $t_1$, and the server begins sending simple data stream 26 and patch data stream 27 at step 66.

Because the first client operating real time with the simple data stream 25 was also listening in on, and recording, patch data stream 27 beginning at data position $p_3$, the simple data stream 25 is discontinued at time $t_3$ (corresponding to data position $p_3$) at step 68 in accordance with the shared and discontinuing patching techniques. At time $t_4$, when the merger has been completed, transmission of the simple data stream is resumed, and the simple data stream 26 and patch data stream 27 are discontinued at step 70. Accordingly, once the merger is completed, the server need only transmit data stream 25 for both clients.

Figure 6:
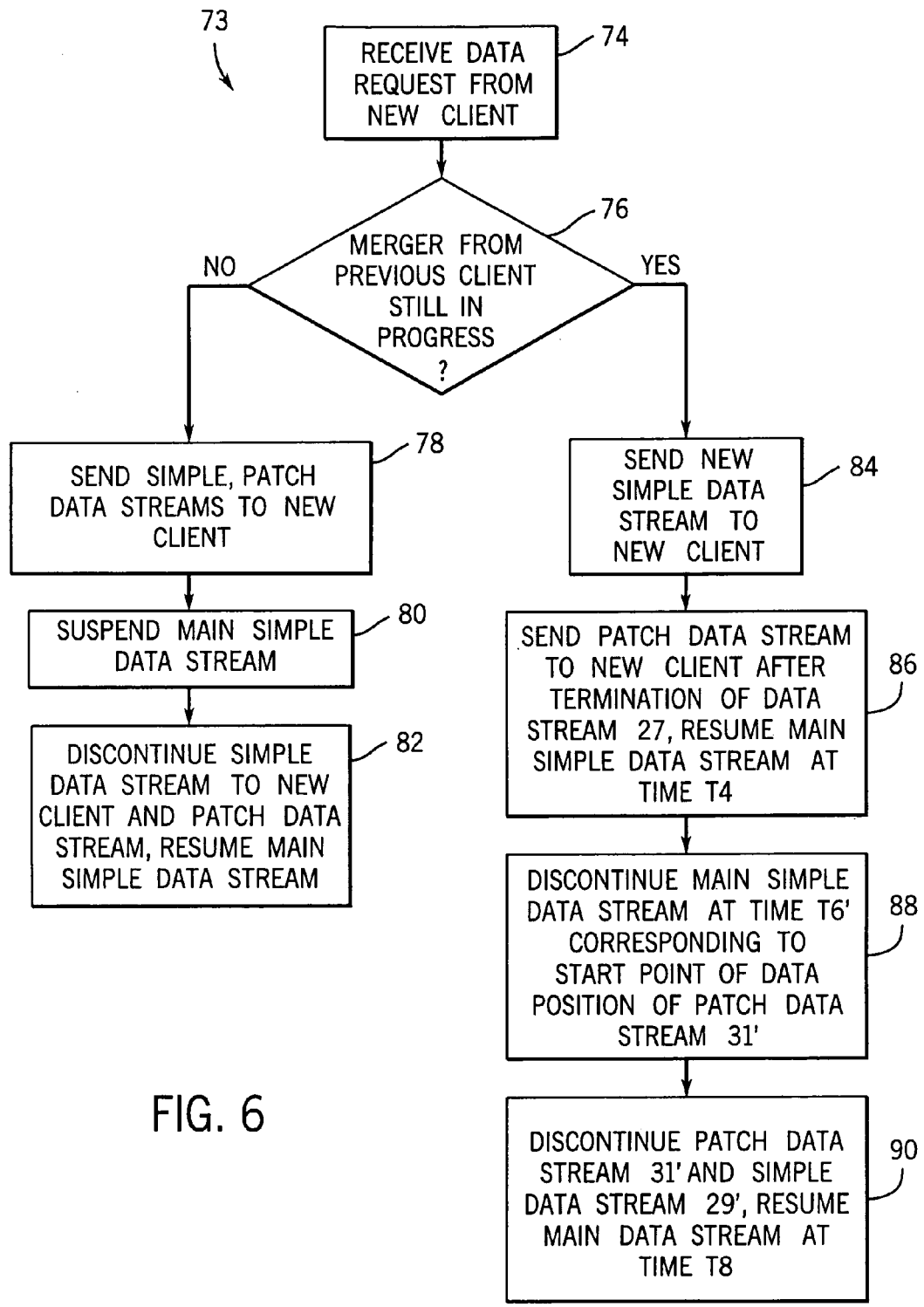
FIG. 6 is a flowchart illustrating the steps performed to transmit data to multiple clients in accordance with the graph of FIG. 4C for the case where a previous merger is ongoing, and for the case where no previous merger is ongoing at the time of a data request from a new client.

With continuing reference to FIG. 6, in the case that the server receives an additional data request from a new client at step 74, process 73 determines whether a merger from a previous client is already in progress at decision block 76. If no previous merger is ongoing, then as described above, a new simple data stream and data patch stream are sent to the new client at step 78 and, at step 80, transmission of the simple data stream is suspended. Once the merger has been completed, transmission of the simple data stream to the new client and patch data stream are discontinued, and the server need only resume transmission of the simple data stream 25 for all three clients at step 82.

If, on the other hand, it is determined at decision block 76 that a previous merger operation is still in progress at the time of the request in step 74, such as at time t2 in FIG. 4C, a new simple data stream 29 is sent to the third client at step 84. Next, at step 86, the server delays sending patch stream 31' to the new client until the previous merge has been completed and transmission of patch data stream 27 has been completed at time $t_4$. Additionally, at step 86, transmission of the data stream 25' is resumed concurrently with patch data stream 31', recalling that the data stream 25 was suspended during transmission of the previous patch data stream 27. Next, at step 88, the main data stream 25' is discontinued at time $t_6'$ to avoid the redundant transmission of data between positions $p_6'$ and $p_8$. Finally, at step 90, patch data stream 31' and simple data stream 29' are discontinued at time $t_8$. Additionally, transmission of data stream 25'' is resumed and transmitted to all three merged clients. The merger of two clients having been completed, the server need only transmit data stream 25'' for three clients, thereby maximizing bandwidth efficiency without requiring any clients to receive twice the bandwidth of the main data stream.

Figure 7:
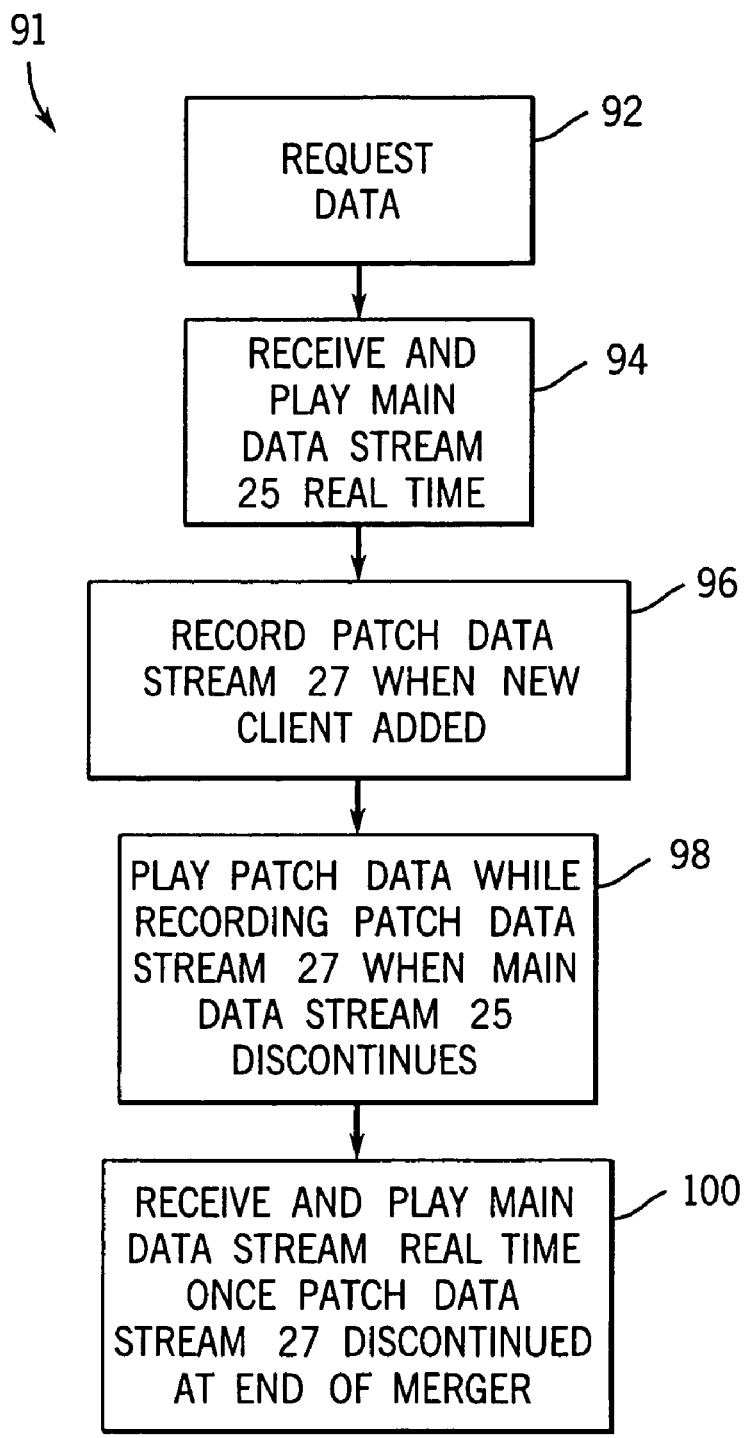
FIG. 7 is a flowchart illustrating the steps performed by a first client to receive data on-demand as illustrated in FIG. 4C.

The steps performed by a first client during a merging operation will now be described with reference to FIGS. 4C and 7. Specifically, process 91 begins at step 92, where the first client requests data to be sent on demand. Next, at step 94, the client receives and plays data from the data stream 25 real time. At step 96, when a second client begins merging at time $t_1$, the first client records patch data stream 27 while simultaneously playing data from the data stream 25. Accordingly, between times $t_3$ and $t_4$, when transmission of data stream 25 is discontinued, the first client will play the stored data from patch data stream while simultaneously recording the current patch data from data stream 27 at step 98. Once all data from patch data stream 27 has been played, and the merger operation of the second client is complete, the first client again receives and plays real-time data from data stream 25'. Steps 96–100 may then repeat for every subsequently occurring merger that may be completed during the transfer of data stream 25.

The steps performed by a new client during a merging operation with no previous merger operation previously in progress will now be described with reference to FIGS. 4C and 8. Specifically, process 101 begins at step 102, when the second client requests data be sent. Next, at step 94, the second client plays real-time simple data transmitted on a new simple data stream, and simultaneously receives and records a patch data stream. As this occurs, the client's composite data stream approaches the mergee stream, until all patch data has been received, and the two streams merge. Next, at step 108, the second client continuously records data from the mergee data stream while playing the previously recorded data. Accordingly, the data played by the second client will lag behind that of the first client by the same amount of time that lapsed between the two requests for data even though the second client receives the same data stream as the first client after the merger.

Finally, the steps performed by a third client during a merging operation with a previous merger operation already in progress will now be described with reference to FIGS. 4C and 9. Specifically, process 109 begins at step 110, when the third client requests that data be transmitted from the server. Accordingly, at time $t_2$, the third client receives and plays real-time data from the new simple data stream 29, while simultaneously recording the ongoing patch data stream 27 from data position p3' to p4 at step 112. At time t4, when the previous merger has been completed, the third client records data from patch data stream 31' data while continuing to receive and play data from the simple data stream 29 at step 114. Between times $t_5'$ and $t_6$ (corresponding to data position $p_3'$ through $p_4$) the third client plays data already stored in its memory from patch data stream 27 while simultaneously recording data patch data stream 31' and simple data stream 29' at step 116. It should be appreciated that during this time interval, the third client is only receiving bandwidth from data streams 29' and 31, which is within the client's capabilities. Once data from data stream 27 has been played, at time $t_6$, the third client will play data previously recorded from simple data stream 29' while continuing to record patch data stream 31' at step 118. Finally, at time $t_8$, the simple data stream 29' is discontinued, thereby signifying completion of the merger, and the third client may begin recording data stream 25" while playing data between positions p6' and p8 from previously recorded patch data stream 31' at step 120. Once data from data stream 31' has been played, the third client will continuously record and play data from data stream 25".

3. Partitioning

Figure 10C:
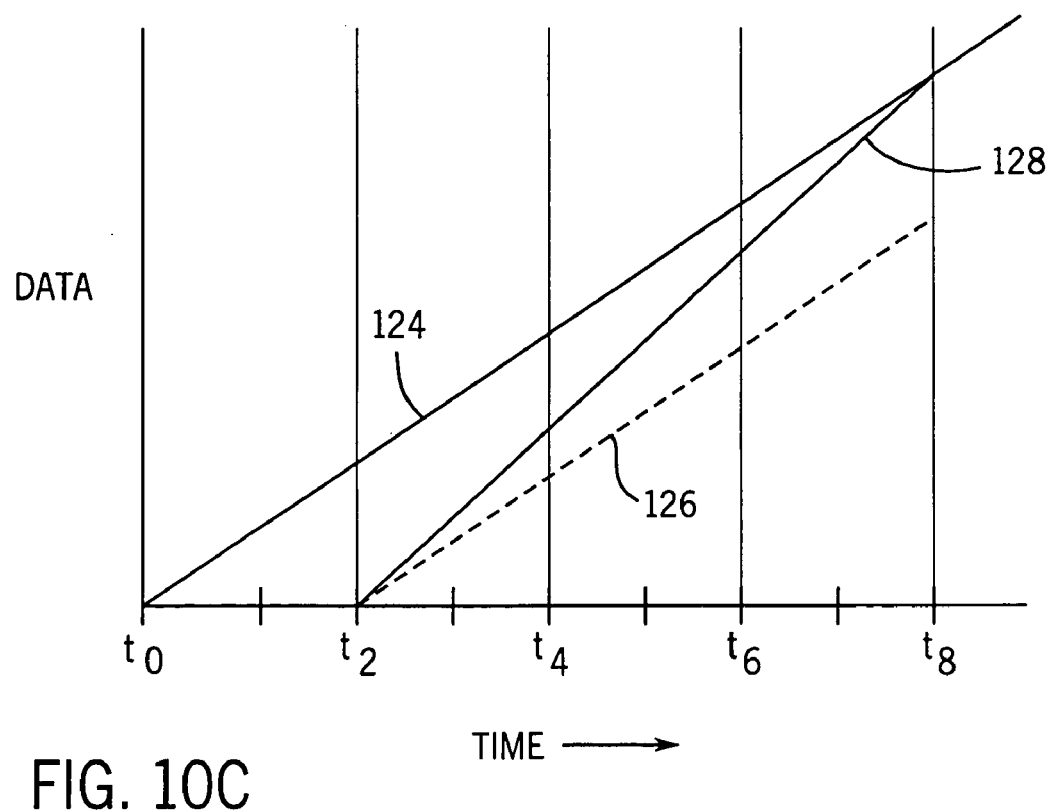
FIG. 10C is a graph plotting program position vs. time under the partitioning technique.
Figure 10A:
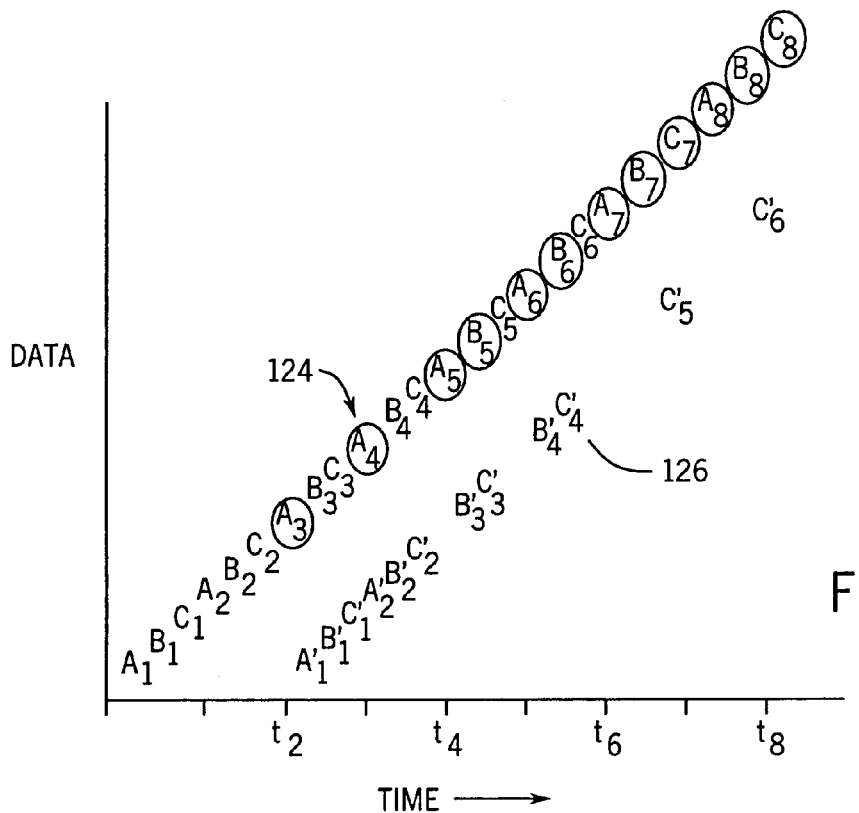
FIG. 10A is a graph plotting program position vs. time for transmissions under the partitioning technique in accordance with yet another embodiment of the invention.
Figure 10B:
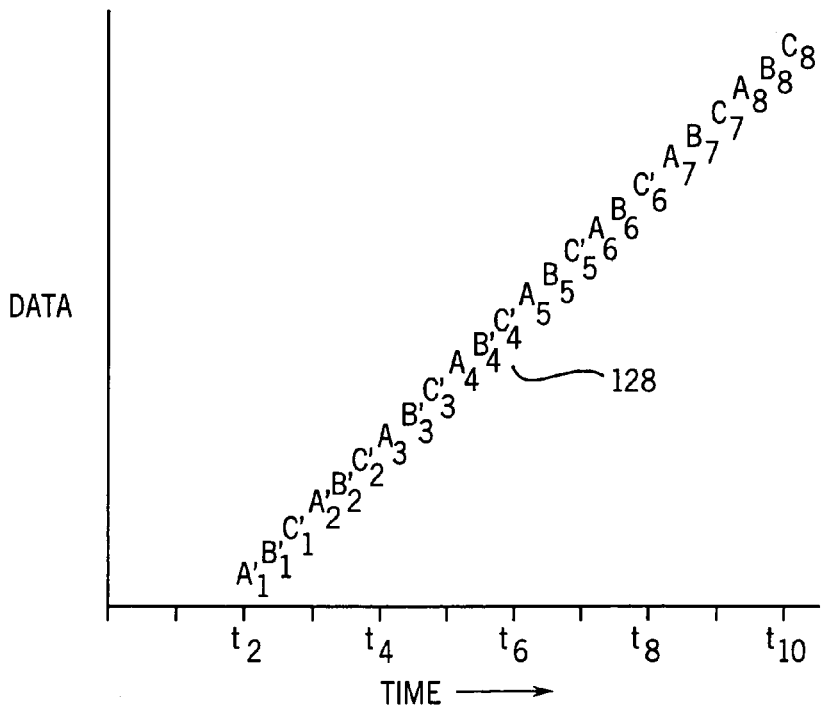
FIG. 10B is a graph plotting program position vs. time for the composite data stream in accordance with the partitioning technique illustrated in FIG. 10A.

Referring now to FIGS. 10A–C, an alternative to the patching techniques described above is a partitioning technique whereby the second client, instead of receiving a separate patch data stream, snoops data from the pre-existing simple data stream 124 while receiving data from a new simple data stream 126. Specifically, referring to FIG. 10A, the data from both simple data streams is received by the clients in a predetermined number of substreams (for example, as realized with separate internet multicast addresses). Three substreams are illustrated in accordance with the preferred embodiment, though it should be appreciated to one having ordinary skill in the art that the number of substreams may be increased or decreased, bearing in mind that an increased number of substreams will reduce the necessary bandwidth but will also decrease the merging speed. On the contrary, decreasing the number of substreams will increase the merging speed, but may require more bandwidth than is available.

In operation, a first client requests data at time t0, and, in turn, receives data from data stream 124 in substreams A, B, and C. File data is interleaved across the substreams in a way that allows a client receiving the substreams to playback the data in real-time; e.g., the first unit of data ($A_1$) is transmitted in substream A, the second ($B_1$) in substream B, the third ($C_1$) in substream C, the fourth ($A_2$) in substream A, and so on.

When a second client requests that on-demand data be sent at time $t_2$, the server transmits a second simple data stream 126 having the same data rate as simple data stream 124 by starting over at time $t_2$ at the beginning of the program. Thus, $A_{1', 2', \ldots, n'}$ et seq. are the same data bits as $A_{1, 2, \ldots, n}$ but have been distinguished for the purposes of illustration and clarity. As a result, the second client is able to receive real-time data from the data stream 126 while recording future data incrementally from data stream 124. As increasing amounts of data are recorded from data stream 126, fewer corresponding amounts of data will be received from data stream 128 until the second client is reliant only upon data stream 126, at which point the merger will be completed, and transmission of simple data stream 126 will be discontinued at time $t_8$.

Accordingly, referring now to FIGS. 10A and B in particular, beginning at time $t_2$, the second client receives data real-time from data stream 126 while snooping data from the data stream 124. In the illustrated embodiment, the second client begins by listening to substream A of data stream 124 concurrently with data stream 126. The data received by the second client from data stream 124 has been circled for the purposes of clarity and convenience.

After time $t_4$, the second client listens to both substreams A and B of data stream 124 and only substreams B and C of data stream 126. Beginning at time $t_6$, the second client will only receive data from substream C of data stream 126 while listening to all three substreams of data stream 124. As a result, at time $t_8$, the second client will be completely reliant on data being transmitted over data stream 124, and the merger will have been completed.

It should be appreciated that subsequent clients may merge in the same manner of the second client regardless of whether the previous merge is ongoing or not at the time of a subsequent request for data. The merging process requires 33% extra client receive bandwidth in accordance with the illustrated embodiment. Accordingly, as can be appreciated with reference to FIG. 10C, the merging process occurs in three intervals: time $t_2$–$t_4$, $t_4$–$t_6$, and $t_6$–$t_8$. However, as described above, this extra client bandwidth requirement could be increased or decreased if so desired.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A method of transmitting program data having a playback rate comprising:
   (a) scheduling a first transmission of a program in response to a client request by a client, wherein the program has a playback rate;
   (b) selecting a target transmission that is farther along in the program as a merge target for the transmission, so that the transmission could merge with the target transmission absent a change in the target transmission; and
   (c) receiving at the client a composite of the first transmission and data of the target transmission, neither of which is time-distorted, wherein a data rate of the composite is a non-integer multiple of the playback rate.

2. A method of transmitting a program data file on-demand, comprising:
   (a) beginning a first transmission of the program data file in response to a first client request for the program data file at a first data file transmission rate;
   (b) beginning a second transmission of the program data file in response to a second client request for the program data file;
   (c) beginning a first patch data transmission in response to the second client request, wherein the patch data is transmitted at a patch data transmission rate slower than the transmission rate of the first transmission of the program data file; and
   (d) discontinuing the second transmission and patch data transmission when the second client is capable of receiving the data file solely from the first transmission of the program data file.

3. The method as recited in claim 2, wherein the second transmission of the program data file is also transmitted at a second transmission rate, and wherein the patch data transmission rate is less than the second transmission rate.

4. The method as recited in claim 2, wherein the first data file transmission rate is equal to a playback rate.

5. The method as recited in claim 2, wherein the first patch data transmission transmits a first segment of data, further comprising discontinuing a portion of the first transmission of the program data file corresponding to the first segment of data.

6. The method as recited in claim 2, further comprising after step (c):

(e) beginning a third transmission of the program data file at a time of a third client request;

(f) beginning a second patch data transmission in response to the third client request; and (g) discontinuing the third transmission and second patch data transmission when the third client is capable of operating from the first transmission of the program data file.

7. The method as recited in claim 6, wherein step (f) further comprises beginning the second patch data transmission after the first patch data transmission has been discontinued.

8. The method as recited in claim 7, wherein the second patch transmission transmits a second segment of data, further comprising discontinuing a portion of the first transmission of the program data corresponding to the second segment of data.

9. A method of communication a program data file to multiple clients on-demand, the method comprising:

(a) beginning a first transmission of the program data file in response to a first client request for the program data file, wherein the program data file is broken up into a plurality of substreams;

(b) after step (a), beginning a second transmission of the program data file in response to a second client request for the program data file, wherein the second transmission includes a plurality of substreams corresponding to the plurality of substreams of the first transmission;

(c) receiving the first and second transmissions at the second client, wherein the second client receives increasing substreams of the first transmission and decreasing substreams of the second transmission; and (d) discontinuing the second transmission when the second client is receiving exclusively the substreams of the first transmission.

\* \* \* \* \*